United States Patent
Nemitz

(10) Patent No.: US 7,309,283 B2
(45) Date of Patent: Dec. 18, 2007

(54) INTERACTIVE NARRATIVE OPERATED BY INTRODUCING ENCOUNTER EVENTS

(75) Inventor: Keith Nemitz, Emeryville, CA (US)

(73) Assignee: Keith G. Nemitz, Emeryville, CA (US)

( * ) Notice: Subject to any disclaimer, the term of this patent is extended or adjusted under 35 U.S.C. 154(b) by 603 days.

(21) Appl. No.: 10/679,790

(22) Filed: Oct. 6, 2003

(65) Prior Publication Data

US 2004/0091848 A1 May 13, 2004

Related U.S. Application Data

(60) Provisional application No. 60/425,988, filed on Nov. 13, 2002.

(51) Int. Cl.
*A63F 9/24* (2006.01)

(52) U.S. Cl. ....................... 463/29

(58) Field of Classification Search ............ 463/31, 463/35, 29
See application file for complete search history.

(56) References Cited

U.S. PATENT DOCUMENTS

| | | | |
|---|---|---|---|
| 4,305,131 A | 12/1981 | Best | |
| 5,161,034 A | 11/1992 | Klappert | |
| 5,358,259 A * | 10/1994 | Best | ............ 463/31 |
| 5,393,071 A * | 2/1995 | Best | ............ 463/35 |
| 5,676,551 A | 10/1997 | Knight | |
| 5,737,527 A | 4/1998 | Shiels | |
| 5,751,953 A | 5/1998 | Shiels | |
| 5,754,770 A | 5/1998 | Shiels | |
| 5,848,934 A | 12/1998 | Shiels | |
| 5,999,172 A | 12/1999 | Roach | |
| 6,222,925 B1 | 4/2001 | Shiels | |
| 6,921,336 B1 * | 7/2005 | Best | ............ 463/32 |

OTHER PUBLICATIONS

"Final Fantasy VIII" PC version user manual, release date in U.S. established as Jan. 25, 2000. http://downloads.planetmirror.com/pub/replacementdocs/Final_Fantasy_VIII_-_Manual_-_PC.pdf, downloaded Oct. 20, 2006.□□.*

(Continued)

*Primary Examiner*—Robert Pezzuto
*Assistant Examiner*—Eric M. Thomas

(57) ABSTRACT

An interactive presentation and/or entertainment system, such as interactive personal computer software and/or interactive, live theater, allows participants to determine the events that occur throughout a story. Given simulated environments and story characters within them, the player introduces elements, picked from a list, which advances the narrative, event by event. Feedback about the current state of the situation or characters provides motivation to choose subsequent events. These events change situations, environments, and/or the characters within the narrative. As a result, greater flexibility and control with less confusion is achieved over previous methods and apparatuses. The story can be rewound and/or played with different choices, resulting in different outcomes. Source image/sound/description data may include prerecorded video, prerecorded audio, prewritten description, live acting, computer-based audio, computer-based imagery, computer-generated dialogue, and/or computer-generated characters. The range of events available are limited only by the design of the narrative, not this apparatus.

5 Claims, 1 Drawing Sheet

OTHER PUBLICATIONS

"Final Fanstasy VIII", Game Contents and release date in U.S. established as Sep. 30, 1999. http://en.wikipedia.org/wiki/Final_Fantasy_8, downloaded Oct. 20, 2006.*

"Final Fantasy VII" PC version user manual, release date in U.S. established as of Jan. 25, 2000 http://downloads.planetmirror.com/replacementsdocs/Final_Fantasy_VII_-_Manual_-_PC.pdf, downloaded Oct. 20, 2006.*

"Final FantasyVII", Game Contents and release date in U.S., established as of Sep. 30, 1999. http://en.wikipedia.org/wiki/Final_Fantasy_8, downloaded Oct. 20, 2006.*

"Super Mario 64" Game user manual, release date in U.S. established as of Sep. 29, 1996. http://downloads.planetmirror.com/pub/replacementdocs/Super_Mario_64_-_Manual_-_N64.pdf.*

* cited by examiner

Cycle of Gameplay

INTERACTIVE NARRATIVE OPERATED BY INTRODUCING ENCOUNTER EVENTS

CROSS-REFERENCE TO RELATED APPLICATIONS

This application claims the benefit of Provisional Patent Application Ser. No. 60/425,988, filed Nov. 13, 2002.

FEDERALLY SPONSORED RESEARCH

None

SEQUENCE LISTING

None

BACKGROUND

The invention relates to branching in personal computer entertainment, computer-based learning, interactive media, electric amusement devices, improvisational theater, computer generation of animated cartoons, and video games. It provides a method and apparatus for interactively invoking a sequence of events which form a narrative. Players simply introduce nouns into narrative settings. These nouns advance the plot by responding to the environment, or by other elements within the setting responding to it.

Interactive narratives have been defined in many different ways, (see U.S. Pat. No. 5,676,551). This invention allows users of a narrative to explore 'what if' scenarios in a manner never available before. 'What if' scenarios are the strength of the interactive narrative. Many people who enjoy linear narratives, such as books and theater, often wish the story had followed a different path. They want to know what would happen if the story had progressed differently. They wish they could choose the course of a story. Interactive narratives offer 'what if' scenarios, and thereby a powerful dimension to the art of storytelling. By opening alternate paths through a story, the user experiences more depth from the story. In linear storytelling, the main character is the prime mover of the action and the path of the story. Interactive fiction strives to place that power into the minds of the audience.

DISCUSSION OF THE PRIOR ART

Computer adventure games, one prior art, are typically operated by instructing an avatar in the game to perform a specific task. These instructions were either literal or contextual. A literal instruction is given by entering sentences into a computer. For example, the player might type "kiss the dragon". The game avatar then performed the task. However, several difficulties arise from a literal interface mechanism. To date, computers are incapable of understanding the full range of human expression available within a typed command. Therefore acceptable commands were commonly restricted to an extremely limited subset of language. Players were often confused by what words were acceptable and what were not.

A contextual command exists within a computer adventure game's environment. The player selects an object in the environment and the game avatar then performs an action specific to that object. An example is, the player selects a dragon in the scene, and because the avatar has no sword, the avatar kisses the dragon. Contextual interfaces simplify computer adventure games by restricting input to objects available within the environment. However, objects in the environment can mislead the player about their purpose. One object might be used for different purposes in different contexts. Also, objects adorning the environment for aesthetic purposes might not be commands. A player who tries to use adornments as commands becomes frustrated when they do nothing. Objects that behave differently in different contexts also frustrate the player, by taking away their sense of being in control. To avoid these hassles, players often resort to the dull strategy of clicking on everything. The potential for a player controlling the story is then wasted. Other problems exist. In spacious 3D environments, a constrained view often complicates a player's task to find command objects. The view isn't necessarily pointing in a direction that contains a command object.

The methods and apparatuses of prior art computer adventure games can be described as verb oriented. Commands given to a character in the story force an action that the character must perform. This is easy to see in text adventure games with examples like: TRAVEL north, PICK up ax, TALK to dragon. In visual, contextual interfaces, the objects selected are nouns, but the object's command always makes the main character perform an action. Consider these examples: click on door->OPEN door; click on ax->PICK up ax; click on dragon->either TALK or KILL, depending upon if the avatar has a sword in their hand. Prior art adventure game mechanisms directly manipulate a story avatar. Therefore, their mechanisms are based on verbs.

Another common problem with prior art adventure games occurs as players guide their avatar through the story. The players get lost in the world. They lose track of where they came from and how to get to where they are going. Although traversing a maze can be a form of entertainment, not every adventure game should be a maze. With this invention, the player is never lost. Discovering new areas of the world never has the downside of causing the player to worry about navigation. In this invention if players make a mistake, they can simple rewind the narrative.

Few adventure games are being made these days. The cost of creating them has increased, and the buying audience has dwindled. It is believed that the audience willing to cope with the frustrations of adventure games did not grow enough to support the cost of developing them. Other types of interactive entertainment incorporates stories, and some offer a branching narrative, but storytelling is not their core gameplay. Typically, their core gameplay is even more difficult than canonical adventure games. Some believe these will eventually replace adventure games, if they haven't already, but such opinions ignore the vast audience of unsophisticated gamers. The invention lowers the bar of entry to interactive narratives without sacrificing their potential richness and challenge.

Another important prior art is the computer simulation entertainment. These products allow players to experience and interact with the inner workings of complex processes and entities. Examples are: the operation of a city, the interdependencies of an ant colony, or even the life of a family. These entertainments are classified as toys more often than games. Their primary entertainment value comes from playing with what makes them tick. Players are allowed to set their own goals and create their own scenarios.

Computer simulations for entertainment are commonly called 'sims'. Since sims do not compete directly with the user, or actively resist their manipulation, players feel free to experiment. These games are based upon the concept of emergent behavior, which can be described loosely as, a simulation's ability to produce results that cannot be anticipated.

A sim entertainment typically offers the player a list of commands or tools which affect the simulation. The player might ignite a fire in the city in order to witness the readiness of its fire department. The player might cause rain to fall on an ant colony to learn how it copes with the danger of flooding. The player might buy a television set for a simulated family and find, as a result, the children grow up with a large vocabulary but fear the world around them.

Unlike adventure games, controlling a sim game is not exclusively verb oriented. Sims have no central or main personality like an adventure game's avatar. Typical sim games are controlled with both verb and noun oriented commands. Verb commands entities specified along with the command, such as: SEND child to school bus, or order an ant to PRODUCE its gathering scent. Sim games also use noun oriented commands to affect an environment like: add a TELEVISION to a household, summon MONSTER to the city. The difference between verb and noun oriented commands can be determined by what they affect. Verb commands typically affect an entity. Noun commands typically affect an environment.

Adventure games are more story oriented than sims. Although a player might be able to tell a story with a simulation, it would be like children telling their own story with dolls rather than experiencing a narrative contained within the simulation. A storyteller would have an extremely difficult time developing stories in prior art sim products because the emergent behavior of a complex simulation conflicts with a narrative's directed flow. Currently, technology is insufficient to cost-effectively construct elaborate branching narratives with unforeseen branches.

The invention described allows simulations to become platforms for interactive narratives while simplifying their operation. It provides storytellers with strong control over their content, while enabling higher quality presentations. Players will have more flexibility and more depth of exploration than previously available. Additionally, it reduces costs sufficiently to attract a wider, less sophisticated audience, thus allowing adventure games to return competitively to the market.

The invention's operation is completely noun driven. It does not use an avatar. Simply put, a player introduces nouns into a story and discovers the result of their introduction. As the player learns how elements interact within situations, trial and error gives way to deliberation and anticipation. The process of discovering each element's usefulness can be a lot of fun. A wealth of richness and depth is achieved in the telling of these stories because the same object might be put to different uses.

Compared to prior art, this invention exhibits its uniqueness by allowing players to interact with a story by using nouns, a first in adventure game interfaces. It also allows simulations to express story content through a predictable mechanism. Although a player is allowed to choose which element to introduce into the story, the game designer or storyteller can predetermine the list of elements the player chooses from.

This invention does not utilize U.S. Pat. No. 5,676,551, which derives a branching narrative by explicitly controlling an avatar's emotions. According to that patent, the player dictates an emotion and the avatar acts accordingly to it and the current situation. This invention foregoes direct manipulation of an avatar. Instead all characters in the setting may react to a noun introduced. This invention focuses on advancing a story by letting users determine the sequence of events in a narrative. Character emotions may change only as a side effect in this invention. However, those changes may be reflected in the character's actions during subsequent events and/or expressed as direct feedback.

In the field of interactive entertainment, there has always existed a tradeoff between control over the experience of the story and control given to the player. The invention offers a unique and useful balance of control. The invention allows the developer to predetermine the number and range of introducible elements. This is an enormous advantage when budgeting and testing a product. The invention also allows the developer to maintain control over the presentation of an event, which allows a product to be built to the highest artistic standards.

The player is benefited by being able to choose the order of nouns introduced and even rewind the sequence of their introduction, thereby allowing the exploration of different sequences of introductions. The player is never lost nor stuck. The mechanism for controlling the sequence is as simple as a context sensitive list of available elements and a rewind command.

The invention allows static and dynamic events. A static event is one where content expressed within the event does not change due to previous events. Static events are important for maintaining a storyline's coherency. A dynamic event presents content that can change depending upon previous events. Dynamic events are crucial for inspiring and rewarding the player. This invention succeeds best when implementations provide compelling reasons to choose one path of events over another. Dynamic events invoke the player's curiosity. Basically, they answer 'what if' questions.

Between events, simulated characters continue to act for narrative continuity. They should always exhibit behaviors appropriate to their individual characters. Perhaps one character's goal is to find the Emerald City such as Dorothy in 'The Wizard of Oz'. Therefore, between the invocation of events, Dorothy's simulated character should be following a yellow brick road. Character simulation is important. Simulated characters can provide a strong sense of reality to character's lives. Dorothy's simulation should even eat and sleep occasionally.

This invention does not exclude avatar based interactive control. It simply does not require it. Actions occurring during the enactment of a noun introduction event may be interactive. Players could be allowed to participate. Consider the example; a fight breaks out while an event unfolds. The player could be allowed to control the physical actions of one character for the duration of the fight. Here is where a game designer or storyteller might reintroduce verb oriented control of a temporary avatar.

Finally, the invention is certainly unique to the field of interactive entertainment. To date, there exists no interactive narrative that branches upon the introduction of nouns. They nearly all branch on direct commands (verbs), picking conversation topics, or navigating locations. Even employing an avatar's inventory items during a game is a command based on the verbs: USE or GIVE.

OBJECTS AND ADVANTAGES

Accordingly, to summarize the objects and advantages of the interactive narrative user interface described in my above patent I submit the following:

The invention seeks to enable quality, interactive entertainment for the least sophisticated of narrative audiences. It offers a greater scope of control for the user with less confusion and higher quality presentations for the developer at a lower cost. This invention will enable more enjoyable experiences with interactive narratives than ever before.

SUMMARY OF THE INVENTION

This invention enables playful control over the order of events which comprise a narrative. It does this by allowing the player to introduce objects or ideas (nouns) into the narrative. The noun's introduction triggers events which progress the narrative in a meaningful way. Players not only choose which nouns to introduce, but they may rewind the narrative if the resulting events do not appeal to them.

This invention defines an event as: what happens when a noun is introduced into a story. These events produce actions or expressions which change the story's situation. For example, the arrival of a character triggers dialogue or other actions. The discovery of an item or information can change a situation. The attainment of a goal often leads to the promotion of new goals or a conclusion. The enactment of an event might be as long as a battle or as short as a wink.

The invention is applicable to all narratives. It can be applied to narratives of any length or subject. It is applicable to every media type supporting a narrative branching mechanism, including interactive theater.

DRAWINGS—FIGURES

The drawing contains a flowchart of the process of accepting noun choices from the user and enacting branches of the narrative driven by those choices.

FIG. 1-100 represents the beginning of the game.

FIG. 1-110 is where the game presents the current state of the story. This could be done with text, graphics, audio, or live action.

FIG. 1-120 is where the game presents the game's nouns to be selected. The choices should be dependent upon the current state of the story.

FIG. 1-130 is where the game checks if the player has made a choice.

FIG. 1-140 represents the case where the story situation has not changed, yet its presentation may need to be updated in a story neutral manner.

FIG. 1-150 is where the chosen noun is introduced into the story.

FIG. 1-160 is where the game determines how the characters react to the noun introduced.

Figure 1:
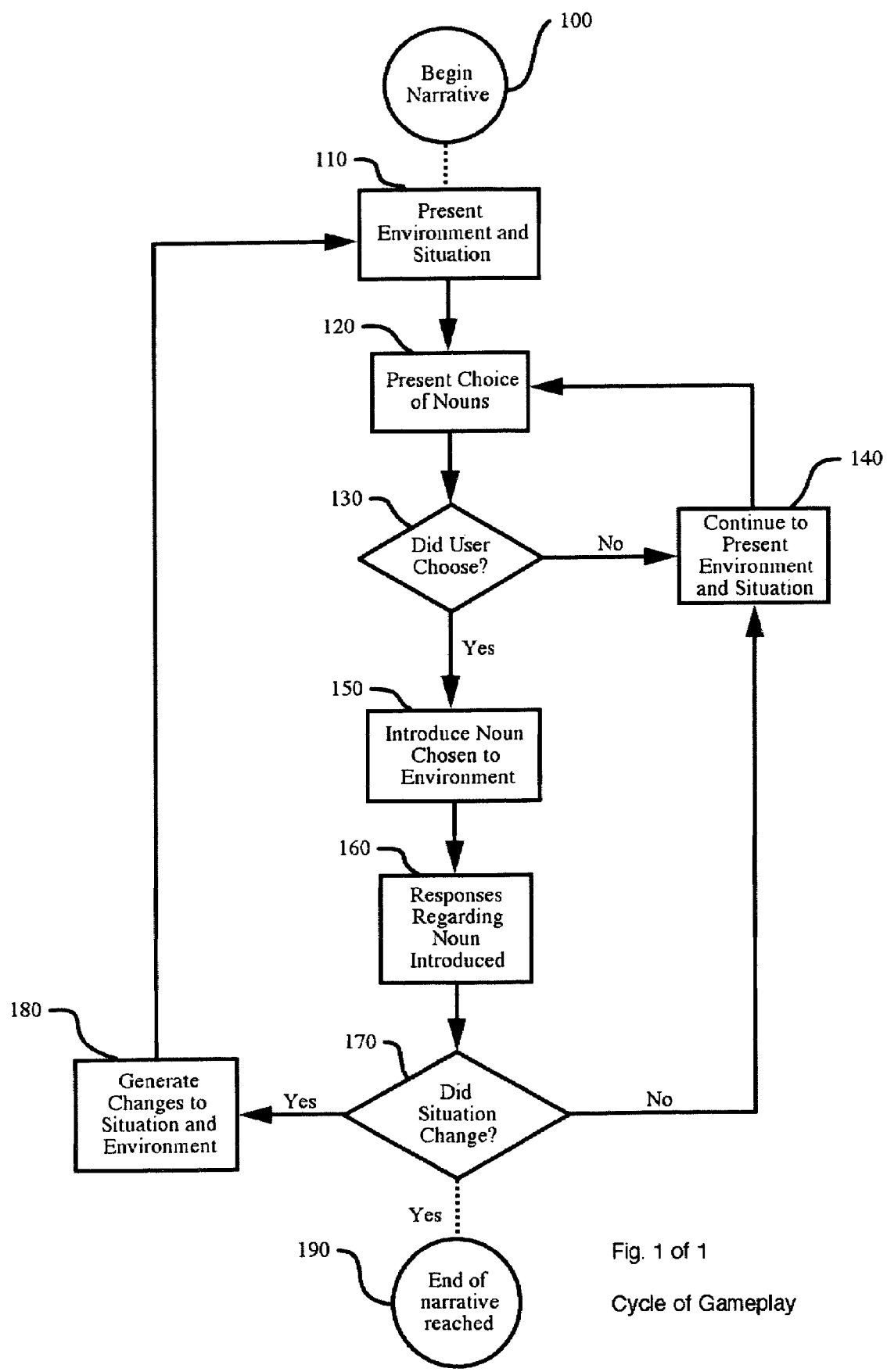
FIG. 1 illustrates the process of control using the invention.

FIG. 1-170 determines if the reactions have changed the situation. Note the special case, 190, is reached only if the situation has changed in a way that ends the game.

FIG. 1-180 is where the game determines how the story environment and characters are modified by the change in situation.

FIG. 1-190 represents an end condition of the game has been reached.

DETAILED DESCRIPTION—FIG. 1—ILLUSTRATIVE EMBODIMENT

The invention can be illustrated in a single cycle of gameplay. We will use the story of Little Red Riding Hood as an example, while we follow the flowchart.

The process begins (FIG. 1-100) typically with an introduction to the game's story. In our example, Little Red Riding Hood's mother sends her into the woods to visit her grandmother, for the first time by herself.

The invention next presents the situation in which the player will interact. (FIG. 1-110) In our example, Little Red Riding Hood is now walking, somewhat nervously, through the woods.

Next, (FIG. 1-120) the invention makes a list of story relevant nouns available to the player. Our example will offer three nouns: berries, woodsman, and wolf.

Should the player NOT choose from the list, (FIG. 1-140) the invention simply continues to present the situation, updating non-plot based story elements. Little Red Riding Hood continues down the path. Perhaps she pauses briefly to tie her shoes. This lets the game seem alive while the player makes her decision.

When the player does choose a noun, (FIG. 1-150) That object or subject is introduced into the environment, hopefully in a believable fashion. The wolf might jump out from behind a tree, or a bush with berries comes into view during her walk, or the woodsman is first heard chopping a tree, attracting Little Red Riding Hood to him. This is where the narrative branches.

(FIG. 1-160) represents what happens in the game as a result of the noun's introduction: Little Red Riding Hood runs away from the wolf, or she begins picking berries, or she talks with the woodsman. The invention requires that these results are determined from the current state of the characters. Initially, Little Red Riding Hood is afraid, therefore she might run from the wolf. But if her fears are eased, perhaps after picking berries or talking with a nice woodsman, she might, instead of running, talk with the wolf. Note, the player does not determine how any character in the game reacts. He only chooses what is introduced into the story.

After the environment and situation has reacted to the noun's introduction, next (FIG. 1-170) the invention determines if the reaction resulted in a change to the situation and/or environment.

If the situation and/or the environment were not changed, then the current situation continues to be presented. (FIG. 1-140).

If the reaction changes the situation and/or the environment, then the invention produces (FIG. 1-180) a new situation and/or environment to be presented. Here also, the state of characters are modified along with other parameters that might only be reflected in future encounters or results.

Alternately, (FIG. 1-190) the story may have reached an end point, and instead of returning the invention's game cycle, an appropriate 'end of the story' scene is presented.

All branching narratives contain a cycle of gameplay where the storytelling mechanism waits for a user's input and then reacts to it. This invention operates from a type of input new to branching narratives. It offers the simple but powerful mechanism of allowing players to introduce story relevant nouns into the narrative environment. Each noun triggers a change in the story. The changes arise from interactions between the current situation, the environment including characters present, and the noun that has been introduced.

Although the illustrative embodiment above contains many specificities, these should not be construed as limiting the scope of the invention but as merely providing illustrations of some of the presently useful embodiments of this invention. For example, the presentation section might be a scrolling page of text that describes the events in written language, as if the implementation were a book that reacted to the reader. The presentation system might be an actual stage with real actors presenting nouns and reacting to the audience's choices.

Thus the scope of the invention should be determined by the appended claims and their legal equivalents, rather than by the examples given.

DETAILED DESCRIPTION OF THE INVENTION i. Introduction

This invention provides a system that enables simple but rich navigation of interactive narratives. It enables an ease of use significantly better than any prior art. Its mechanism is truly unique and beneficial in its field. With the invention, one or more people can participate in an interactive: motion picture, television or audio program, live theater, or a computer-based or computer-generated story. It lets participants determine the course of a narrative. Players are able to explore the events of a story (in the form of motion picture images, television images, live theater, audio, computer-based images, or computer-generated images) with greater control and less confusion than ever before.

ii. Purpose

The purpose and use of this invention sits squarely in the field of entertainment. It is a mechanism which opens up narratives for exploration at the cause and effect level of a story's sequence of events. The invention can be implemented by any device or performer that 1.) transmits a narrative and 2.) accepts input that controls its transmission.

The invention also overlaps the fields of education, simulation, counseling, and therapy, similar to how regular storytelling overlaps them, but the invention offers unique benefits for those fields.

iii. Comments on Style

The description will show, in sections, how to use the claims and prior art to create this invention. Since interactive narratives are largely artistic endeavors, a great range of variations must be allowed. However, all implementations will use a significant portion of the claims. Claim 1 is essential. Some of the claims are considered fundamental to the invention, and others will be optional.

Each claim will be discussed as to its merits over previous methods.

Each step will be demonstrated by an example. All of the examples will be taken from a hypothetical implementation of the story of Little Red Riding Hood.

1. Breaking a Story Down into Nouns.

For the purpose of this invention, we define a story as a sequence of events. We define an event as a continuous period of activity involving a single or multiple characters, reacting to a specified noun. The invention allows for additional storytelling, presented between events for continuity. For the remainder of this section, we will use the terms elements and story elements to refer to these nouns.

As per claim 1.*c*., developers should identify elements (nouns) that advance their game's story. Developers should create distinct symbols, labels, phrases, or other identifiers for each element. A player will use these elements to control the narrative. Compared to prior art, the introduction of nouns is a powerful tool for advancing a story and affecting the characters within it. No other prior art device uses the introduction of nouns to trigger events as the primary control system for advancing an interactive narrative. Introducing elements is fundamental to this invention.

For example, if we examine the tale of Little Red Riding Hood, we identify the following story elements:
Mother at Home
Little Red Riding Hood
Berries in the Forest
The Wolf
Grandma's House
Grandma
The Woodsman These nouns are the primary building blocks of the story of Little Red Riding Hood. The invention uses them to trigger events which progress the narrative. Note that we will not make available, Mother at Home, in any of the lists presented. She is only used to begin the story. Not all elements of a game's story need to be used to control that game. But it's worthwhile to identify every noun that could potentially be used to control a game.

2. Introducing the Narrative to the Player.

Nearly always, a narrative begins by presenting the environment and the initial characters and their situation. It is typically presented without interaction, as are the introductory sequences of prior art. By beginning each game the same way, players can be certain that they are starting at the beginning. This provides a comfortable foundation for their explorations. As per claim 1.*a*., the simulated environment and (as per claim 1.*b*.) the first simulated characters are typically introduced here as well. These two pieces of claim 1 are common to prior art, and are necessary for every branching narrative.

In our example, when the game begins, the player is presented with a scene where the mother sends her daughter into the woods to visit her grandma.

3. Using Settings to Constrain Combinatorial Explosion

Every successful branching narrative must cope with the problem of combinatorial explosion. Combinatorial explosion in this invention would result when there are so many different ways to order the introduction of story elements, developing all of the resulting events would prove too expensive. Therefore, one of the invention's mechanisms must let designers limit the combinations of element introductions. This allows cost effective development. Fortunately, narrative structnre provides many natural and effective means to constrain the number of resulting events. They are scenes, locales, chapters, acts, or settings. This document uses the term 'setting' for these structures.

As per claim 3, the invention uses settings to limit the events that can happen during those segments of the narrative. For a given setting, the developer, or the simulation itself, decides which set of elements will be available to the player during that setting. The use of settings to limit elements available in a narrative is unique to this invention. Although, not required for this invention, settings will be used frequently for limiting the combinatorial explosion of potential results.

There are two settings in the tale of Little Red Riding Hood, 'The Forest' and 'Grandma's House'. In our example, some nouns will be allowed only in the Forest. Other nouns are allowed only in Grandma's House, and some nouns will be available in both settings.
Forest
  berries
  wolf
  woodsman
  grandma's house
Grandma's House
  wolf grandma
woodsman In this example, the nouns available in each setting have been predetermined, as per claim 2.

4. Simulating the Characters.

The construction of this invention requires goal driven simulations of the main character or main characters. This document does not describe how to implement a character simulation since that is considered prior art. Here we describe using such a simulation in a manner unique to this invention, as per claim 1.b.

It's a lot of fun to play with a puppet dancing to strings on your fingers. It makes players feel powerful and in control. It's even more fun to have a pet that plays with the things you give it. Unlike current adventure games, with this invention, players do not directly control the character's steps or actions. Players influence the actions of the character by introducing nouns into a setting which trigger events significant to the story.

With this invention, whenever an event is triggered, enacted, and resolved, the simulated characters can change. Their emotions, goals, physicality, and personality can all change as a result of an event. This supports a narrative's common practice of revealing how a character changes during a story. In implementations of this invention, simulated characters should directly reflect their changes. In order to do that, this invention requires two capabilities from the simulations' implementation.

4.a. The character simulation must provide feedback about physical and emotional states. Exactly which types of states depend upon the story being told. (Detailed in section 5, below.)

4.b. Every character in the simulation must maintain a goal. They must be trying to accomplish that goal, perhaps with occasional, character oriented sidetracks. The player should be informed of that goal.

In our example, Little Red Riding Hood is implemented as a self motivated, simulated personality that acts like a little girl. By design, she will automatically seek to accomplish a goal.

example of 4.a. She shows her emotional states by what she says, by her animations, and by visual meters that indicate internal states.

example 4.b. When Little Red Riding Hood is trying to get to grandma's house she will be walking in the forest in a specific direction. To demonstrate her character's youthful nature, she occasionally chases a butterfly but resumes walking towards her goal immediately thereafter.

5. Generating a List of Elements

This section describes the heart of this invention. To recap the previous sections: The player has been introduced to a situation and its world, and she or he is watching simulated characters acting within a setting. Now it is time for the player to influence the story. As per claim 1.d., the player will be given a list of story elements they can use to branch the narrative. Introducing these nouns into the simulation generates events which advance the story. Noun operated branching of a narrative is unique to this invention. It is fundamental to this invention.

How a list of elements is generated is important. As per claim 2, the invention provides two methods for generating the list. The list could be pre-generated, as provided in our Little Red Riding Hood example. The list could also be generated programatically, based upon the narrative state. A device that determines the list at the time of presenting the list is programatically generating the list. A performer who determined the list during his or her performance would be 'winging it'. Automatically generated lists should be based upon the current situation and directions the story might head. One method might prune an exhaustive, predetermined list. A very sophisticated storytelling engine might create new characters, objects, activities, and/or places to present as event triggers.

Controlling the list of events during the narrative is an essential aspect of the invention. One method of constraining combinatorial explosion, the setting, has already been described. List construction is another tool for limiting permutations of story branches and therefore, development costs.

At the beginning of Little Red Riding Hood, she walks cautiously through the forest. The list generated for the player's consideration consists of:

wolf
woodsman
berries

In this example, the 'Grandma's House' element is pruned from the pre-generated list. This forces the player to pick some other kind of encounter before Little Red Riding Hood reaches Grandma's house. Consider it a primitive example of a programatically generated list. In other words, the list changes depending upon whether or not the player has already invoked an event.

6. Displaying the Noun List and Responding to the Player's Selection.

Once the list of nouns has been generated, the apparatus either interrupts the player with the list or waits for the player to request the list. As per claim 1.e., the player simply selects a noun from the list to use the invention. While the effort of selecting an element is trivial, determining the noun that results in the most desirable outcome can be quite challenging. Players will quickly figure out how they want the story to progress. They will enjoy discovering how each element influences the story.

Choosing an noun which triggers a desired event is rewarding. Choosing an noun that produces an undesirable event is the penalty for not understanding the character or situation. The player is motivated to explore his options. An event's immediate enactment, after choosing an element, is more exciting than wandering around (often lost in) the large landscapes typical of prior art adventure games.

This invention creates experiences where an audience can easily explore the full richness of an interactive story and the characters within. The best implementations will supply, in their display of nouns, clues to an event's resolution. By observing the character's feedback, the user will begin to anticipate how that character will react to certain stimuli. However, interesting surprises could always be a lurking possibility.

The invention provides powerful tools to modify the simulation and advance the narrative. The tools are nouns introduced into a story which cause characters to react, interact, and change. As per claim 1.h, the outcome of every event potentially modifies: characters, objects, the environment, and the situation.

This invention supports game play where the sequence of events changes, as per claim 1.g. If a narrative's events occur in one sequence, then the story's outcome is one experience. Different sequences of noun choices could produce different events. By offering players a set of tools in the form of nouns, they can create the experience that pleases them most.

In the example, a noun list will be offered after each event resolves. The list appropriate for the current situation is displayed. From the list players would make their selection. Below are the example's elements with a brief description of their enactment.

If the Little Red Riding Hood is in the Forest setting, the list contains:
wolf:
   if she is afraid: she runs away.
   if warned: she fools the wolf by claiming the woodsman has broken his ax.
   otherwise: the wolf sweet talks her and learns grandma is alone.
woodsman:
   warns her about wolves.
berries:
   she goes on a berry hunt that makes her less afraid.
   (Player participates during event.)
grandma's house:
   if the wolf is fooled: show wolf's demise and end story.
   otherwise: plays a static scene of arriving at the house and entering it.

If Little Red Riding Hood is in the Grandma's House setting, then this is the list:
wolf:
   she discovers wolf in grandma's clothing and is chased around the house.
woodsman:
   if wolf is chasing her: he dispatches the wolf.
   otherwise: he congratulates her on arriving safely and doesn't return.
grandma:
   she is surprised by the wolf and is eaten. End story.

7. Resolving an Event.

Once an element is introduced, the event it triggers must then be enacted, as per claim 1.f. How an event plays out is decided by the developer. Respecting this invention's definition of an event, the playing or resolution of it should advance the story significantly. A person or creature is met and engaged. An item or sight or sound or idea meaningful to the plot is found, pondered, or otherwise reacted to. Perhaps a trial is encountered which must be overcome. Also, unremarkable actions or happenstance's might be useful as adornments or for stylistic flavor. Unremarkable events should be enacted sparingly if enacted at all. By virtue of introducing an element, the narrative is usually advanced.

The most important feature of this invention is that an event should change something in the narrative. What might change includes: the characters, the environment, the list of elements available, and/or other aspects of the story.

An event doesn't have to change the narrative, but most events should. They keep the player's experience interesting. In prior art adventure games, it was very difficult to change the nature of a character. Players were given absolute control over the character's actions. With this invention, characters will be able to react more like characters in a story. Therefore the invention is able to tell stories better than prior art.

In our Little Red Riding Hood example, if the main character is still in the Forest, and the player introduces the 'berries' element, the game would proceed to move Little Red Riding Hood until she reaches a patch of berries in the forest. Since the important part of event resolution is the changes it bestows upon the narrative, we should define an initial situation for Little Red Riding Hood. Let's say that upon leaving home, by herself for the first time, she begins the story very afraid of the forest. Her face and actions indicates this fear. When she encounters a patch of berries, she remembers that the forest can also harbor nice things. Nice thoughts soften fears. So, upon picking some berries she begins to feel a little less afraid. As a result, two things have changed in the narrative. First, she now has a nice basket of berries to give to her grandma, and second, Little Red Riding Hood feels less afraid. Perhaps her fear is lessened to the point where, when the wolf encounter is enacted, the girl listens to the wolf instead of running away.

Additionally, while the game is waiting for the user to make a choice, or the last choice failed to advance the story, continuity must be maintained. The environment and characters should continue to be presented, acting accordingly to the current context, as per claim 5. This is not very obvious, due to the step-wise method inherent to the invention.

8. Allowing Other Interactions

Game designers should consider the amount of interactivity a player is allowed during event enactment, as per claim 4. It has been mentioned previously, that in a fight situation, the player might be allowed to control a character's actions during the fight. Many times, in prior art adventure games, allowing full, player control over the actions of the characters proved very useful and fun, and this would be a lesser invention if it did not allow absolute player control in useful and fun situations. Therefore, within the event itself, sometimes it is best to let the player completely control the actions of the character. However, only the final resolution of the event should affect story. Interactions during the event should not affect the character's personality, goals, or the situation.

There is a fine point to be made here. Although the outcome of an interactive event could be determined by the player's actions, only the final result of the event should affect the story. A player might win or lose a fight a dozen different ways, but only the final result, the win or loss, should affect the story. The methods employed to gain the end of the event do not have to, and probably should not, affect the story. If it did, it would create another opportunity for a combinatorial explosion of outcomes.

An interactive story of Little Red Riding Hood might contain a simple game when she encounters berries. The event specific game might be a hunt for enough berries to fill her basket. Once the basket is full, event resolution concludes and the narrative resumes. These extra interactions improve the player's enjoyment, drawing them closer to the story by involving them in the character's experiences.

A. SUMMARY

This detailed description has explained how to use the claims of this invention to create a branching narrative. It has demonstrated how the claims are unique and has discussed their advantages over previous methods. It has provided a complete example of implementation.

Begin with a narrative that can be described as discrete events which occur in a story's characters. Define settings to limit event branches. Determine which story elements (nouns) will trigger the events in each setting. Build simulated characters which react to the nouns according to each character's nature. Allow players to choose the order in which nouns are introduced into the game. Provide feedback about characters and the situation players can consider for later noun choices. Move from setting to setting as the narrative allows. Let the simulated characters and environment act between events for continuity. Allow users to interact in other ways, during event resolution, to add depth to the gameplay. Let users rewind the narrative, and let them explore alternate event sequences.

The example of Little Red Riding Hood has illustrated a potential implementation of this invention's claims. It has also indicated the depth possible in a branching narrative, even for a story as simple as a children's fable.

I claim:

1. A method for executing and presenting an interactive narrative, one that allows a user of the invention to influence the sequence and outcome of a narrative's situations, comprising:
   (a) a simulated environment where the narrative occurs;
   (b) simulated, autonomous characters who are involved in the narrative's situations;
   (c) identifying nouns which are appropriate for and could be introduced into a situation;
   (d) presenting a group of the nouns to the user;
   (e) allowing the user to choose from the group of nouns;
   (f) introducing the noun chosen, directly into the environment, independently of an intermediary agent;
   (g) advancing the narrative by enacting responses to or interactions with the noun introduced, by characters and other elements in the situation;
   (h) modifying or updating characters and other objects involved in the enactment, resulting in a new narrative situation.

2. The method of claim 1, wherein the lists of nouns may either be determined during the design and implementation of a product based on the invention or are generated as a result of situations previously presented during the product's execution.

3. The method of claim 1, wherein the nouns presented to the user are drawn from a finite set allowed to be introduced within a section of the narrative, such as a chapter or a locale.

4. The method of claim 1, wherein the user is allowed to interact with the narrative during the enactment of responses to and interactions with the noun introduced, either for the purpose of affecting the outcome or for the activity's sake itself.

5. The method of claim 1, wherein characters in the narration, outside the enactment of an introduced noun, may act in a story neutral manner to maintain the story's continuity until the next noun is introduced.

* * * * *